United States Patent [19]
Yamazaki et al.

[11] Patent Number: 4,876,022
[45] Date of Patent: Oct. 24, 1989

[54] METHOD FOR PREPARING FERROMAGNETIC IRON OXIDE PARTICLES

[75] Inventors: Nobuo Yamazaki; Tatsuji Kitamoto, both of Kanagawa, Japan

[73] Assignee: Fuji Photo Film Co., Ltd., Kanagawa, Japan

[21] Appl. No.: 928,487

[22] Filed: Nov. 10, 1986

[30] Foreign Application Priority Data

Nov. 8, 1985 [JP] Japan ................................ 60-249018

[51] Int. Cl.⁴ .............................................. C04B 35/26
[52] U.S. Cl. .............................. 252/62.56; 252/62.58; 252/62.59; 252/62.63
[58] Field of Search ............... 423/594, 632, 633, 634; 252/62.56, 62.58, 62.59, 62.63; 427/127, 128

[56] References Cited

U.S. PATENT DOCUMENTS

| | | | |
|---|---|---|---|
| 3,654,163 | 4/1972 | Makino et al. | 252/62.63 |
| 3,720,618 | 3/1973 | Toda et al. | 252/62.56 |
| 3,887,479 | 6/1975 | McLain | 423/594 |
| 3,903,004 | 9/1975 | Matsumoto et al. | 252/62.56 |
| 4,033,891 | 7/1977 | Matsui et al. | 423/634 |
| 4,255,492 | 3/1981 | Audran et al. | 423/634 |
| 4,296,149 | 10/1981 | Rudolf et el. | 252/62.56 |
| 4,297,395 | 10/1981 | Buxbaum et al. | 252/62.56 |

FOREIGN PATENT DOCUMENTS

7439974 7/1974 Japan .
49-47574 12/1974 Japan .
3766775 4/1975 Japan .

*Primary Examiner*—Patrick P. Garvin
*Assistant Examiner*—George R. Fourson
*Attorney, Agent, or Firm*—Sughrue, Mion, Zinn, Macpeak, and Seas

[57] ABSTRACT

A method for preparing ferromagnetic iron oxide particles comprising the steps of depositing Co-ferrite fine particles onto the surface of acicular iron oxyhydroxide particles and then calcining said acicular iron oxyhydroxide having said C0-ferrite fine particles deposited thereon.

5 Claims, No Drawings

METHOD FOR PREPARING FERROMAGNETIC IRON OXIDE PARTICLES

FIELD OF THE INVENTION

The present invention relates to a method for preparing ferromagnetic particles used for a magnetic recording medium, and more particularly it relates to a method for preparing cobalt ferrite-modified ferromagnetic iron oxide particles.

BACKGROUND OF THE INVENTION

A so-called Co-doped type of ferromagnetic iron oxide is used as ferromagnetic particles having a high coercive force (Hc) which is necessary for high density magnetic recording. The Co-doped type iron oxide can be prepared, for example, by adsorbing amorphous cobalt compounds such as cobalt hydroxide ($Co(OH)_2$) on acicular iron oxyhydroxide (acicular $\alpha$-FeOOH) (referred to as "acicular goethite" hereinafter), washing with water, filtering, drying, and then calcining (dehydrating, reducing, and, if necessary oxidizing) to prepare acicular iron oxide particles ($\gamma$-$Fe_2O_3$), and simultaneously diffusing cobalt ion into the thus prepared acicular iron oxide particles. Hereinafter the above method is called a "Co-doping method".

The process of the Co-doping method is relatively simple and the manufacturing cost is relatively low, but there are some defects in that the thus obtained magnetic particles are easily influenced by temperatures, for example, the Hc (coercive force) changes about 100 Oe with a 10° C. difference in temperature, demagnetization heavily occurs by adding pressure and by heating and print through phenomenon easily occurs in a magnetic recording medium prepared by using the above-described magnetic particles.

In order to remove these defects, it has recently been proposed, for example, as disclosed in Japanese Patent Publication Nos. 49475/74 and 29157/75, and Japanese Patent Application (OPI) Nos. 74399/74 and 37667/75 (the term "OPI" as used herein means an "unexamined published application"), that instead of diffusing cobalt into $\gamma$-$Fe_2O_3$ particles, $\gamma$-$Fe_2O_3$ particles be coated with cobalt, or modified by cobalt to prepare ferromagnetic iron oxide.

Those magnetic particles are prepared by water-washing, filtering, drying and calcining (dehydrating, reducing, and, if necessary oxidizing) an aqueous suspension of, for example, acicular goethite particles to prepare acicular magnetic iron oxide ($\gamma$-$Fe_2O_3$), and then adding cobalt hydroxide, cobalt sulfate, ferrous hydroxide, an alkali and the like to the aqueous suspension to prepare the product by a so-called wet reaction. Hereinafter this method is called a "Co-modifying method".

The Co-modified ferromagnetic iron oxide particles prepared by the above Co-modifying method have favorable characteristics in that these iron oxide particles are hardly influenced by temperature differences (i.e., changing several Oe with 10° C. difference), demagnetization caused by adding pressure and by heating is low and print through phenomenol hardly occurs. However, the manufacturing process is complicated, the manufacturing period is long, and the manufacturing cost also becomes high, because as is clear from the above-described process, once acicular magnetic iron oxide ($\gamma$-$Fe_2O_3$) is formed, Co modification must then be conducted by wet reaction.

SUMMARY OF THE INVENTION

Accordingly, an object of the present invention is to provide a method for preparing ferromagnetic iron oxide particles having the same excellent characteristics as those prepared by the above described Co-modifying method in the same simple manner as that of the above described Co-doping method.

As the result of the earnest investigation by the present inventors, the above and other objects of the present invention have been achieved by providing a method for preparing ferromagnetic iron oxide particles comprising the steps of depositing Co-ferrite (Co-$Fe_2O_4$) fine particles onto the surface of acicular iron oxyhydroxide (goethite) particles, and then calcining the acicular iron oxyhydroxide particles having the Co-ferrite fine particles deposited thereon.

DETAILED DESCRIPTION OF THE INVENTION

The present invention will be described in more detail hereinafter.

It is preferred that the particle size of the Co-ferrite particles is $\frac{1}{2}$ or less of that of acicular goethite. The combination of the acicular goethite having a length in short axis of 400 Å or less and the Co-ferrite particles having a particle size of 200 Å or less is more preferred.

In the present invention, it is preferred that an aqueous suspension of acicular goethite particles and of Co-ferrite fine particles be mixed and stirred for several tens minutes at room temperature to deposit Co-ferrite particles onto the surface of the acicular goethite particles. In this instance, the Co and/or Fe ion of Co-ferrite can be partially substituted with other ions such as Zn, Cd, Ba, Si, Al and the like in an amount of 50% or less, preferably 10% or less.

An aqueous suspension of Co-ferrite fine particles can be prepared, for example, by dissolving ferric sulfate and cobalt sulfate substantially stoichiometrically in water, heating and stirring the mixture at a temperature of 100° C. or less under alkaline conditions, that is the pH of from 7 to 13, preferably from 7.5 to 12. Subsequently, the acicular goethite particles having deposited on the surface thereof Co-ferrite fine particles are washed with water, filtered, dried and calcined. The calcination is substantially similar to that of the Co-doping method. That is, the above-described acicular goethite particles having the Co-ferrite fine particles deposited thereon are dehydrated at 300° C. to 350° C., reduced at a temperature of 300° C. to 450° C. in the presence of hydrogen gas, carbon monoxide gas or, organic substances such as palm oil or fatty acid salts, and oxidized at 200° C. to 300° C. in the presence of air or oxygen gas. By the above calcination, the acicular goethite particles are converted to hematite ($\alpha$-$Fe_2O_3$) by dehydration treatment, to magnetite ($Fe_3O_4$) by reduction treatment, and to acicular magnhemite ($\gamma$-$Fe_2O_3$) by oxidation. Since Co-ferrite particles have been adsorbed on the surface of he above-described acicular goethite particles, $\gamma$-$Fe_2O_3$ particles coated with Co-ferrite can be obtained by the above calcination process. Those particles thus obtained are called cobalt ferrite-modified $\gamma$-$Fe_2O_3$ herein.

The acicular ferromagnetic iron oxide particles obtained in the present invention exhibit high coercive force and high saturation magnetization and have similar characteristics to those of magnetic particles obtained by the above-described Co-modifying method regarding dependence on temperature, demagnetization caused by adding pressure and heating and print through, and can be used for magnetic recording medium such as audio tapes, video tapes, computer tapes or disks, etc. similar to conventional ferromagnetic iron oxide.

The present invention is further illustrated in more detail by the following Example and Comparative Example, but is not limited thereby in any way.

Unless otherwise specified, all percents, ratios, etc. are by weight.

EXAMPLE 34.7 g of ferric sulfate 7 hydrate and 18.5 g of cobalt sulfate 7 hydrate were dissolved into 1,000 ml of water and were stirred in a 3 liter beaker. A solution having 30 g of sodium hydroxide dissolved in 500 ml of water was added to the above mixture so that the pH of the mixture became 10, and the mixture was stirred for 3 hours at 80° C. to form a suspension of Co-ferrite (Co-Fe$_3$O$_4$) fine particles.

Then 200 g of an aqueous suspension (slurry) (solid content: 50%) of acicular goethite (specific surface area: 48 m$^2$/g, axis length: 0.3 micrometer) were added to the above described Co-ferrite suspension, stirred vigorously for 30 minites at room temperature, washed with water, filtered and dried.

The thus obtained acicular goethite particles having Co-ferrite fine particles deposited thereon was dehydrated at 450° C., reduced in an H$_2$ atmosphere at 350° C., and oxidized in the air at 250° C. to obtain cobalt ferrite-modified γ-Fe$_2$O$_3$.

COMPARATIVE EXAMPLE

The acicular Co-doped type ferromagnetic iron oxide was prepared by the above-described Co-doping method.

While 500 g of slurry (solid content: 20%) of acicular goethite (specific surface area: 48 m$^2$/g, axis length 0.3 micrometer) were stirred, a solution of 500 ml of water having dissolved therein 18.5 g of cobalt sulfate 7 hydrate was added and after 10 minutes, a solution of 500 ml of water having dissolved therein 30 g of sodium hydroxide was added until the reaction solution had pH of 10 and was heated for 3 hours at 80° C. After the reaction, the product was washed with water, filtered, dried, dehydrated at 450° C., reduced at 350° C. and oxidized at 250° C. to obtain Co-doped γ-Fe$_2$O$_3$.

The demagnetization caused by adding pressure was measured in the following manner regarding each sample obtained in the Example and Comparative Example.

The magnetic particles were coated, subjected to orientation, and then dried to make a sheet type magnetic recording medium, respectively. The thus obtained samples were set on VSM (vibrating sample magnetometer) and charged in a magnetic field of 5 KOe to realize saturation magnetization. Then, these samples were pressed with 2 ton/cm by an oil pressure to measure residual magnetization.

The demagnetization caused by adding pressure is calculated by the following formula:

$$\text{Demagnetization (\%)} = \left( \frac{\Phi_0 - \Phi_1}{\Phi_0} \right) \times 100$$

wherein $\Phi_0$ represents the residual magnetization before the addition of the pressure, and $\Phi_1$ represents the residual magnetization after the addition of the pressure.

In this case, the coercive force (Hc) and the saturation magnetization ($\sigma_s$) were measured by VSM in the outer magnetic field of 5 KOe.

The results are shown in the following Table 1.

TABLE 1

| Sample | Hc (Oe) | $\sigma_s$ (emu/g) | Demagnetization (%) |
|---|---|---|---|
| Example | 608 | 73 | 13 |
| Comparative Example | 618 | 71.6 | 35 |

It is clear from the above results that magnetic particles obtained by the method of the present invention exhibit similar properties to those of the Comparative Example regarding Hc and $\sigma_s$, but the demagnetization caused by adding pressure is greatly improved by the method of the present invention.

The cobalt ferrite-modified ferromagnetic iron oxide particles of the present invention exhibited similar values as those of particles obtained by the above described Co-modifying method regarding temperature dependence, print through and the like.

In accordance with the present invention, acicular ferromagnetic iron oxide particles having the excellent coercive force, saturation magnetization, temperature dependence and demagnetization caused by adding pressure and the like similar to those of particles obtained by the Co-modifying method can be prepared in a simple manufacturing process.

While the invention has been described in detail and with reference to specific embodiments thereof, it will be apparent to one skilled in the art that various changes and modifications can be made therein without departing from the spirit and scope thereof.

What is claimed is:

1. A method for preparing ferromagnetic iron oxide particles comprising the steps of depositing Co-ferrite fine particles onto the surface of acicular iron oxyhydroxide particles and then dehydrating, reducing, and oxidizing said acicular iron oxyhydroxide having said Co-ferrite fine particles deposited thereon.

2. A method for preparing ferromagnetic iron oxide particles as in claim 1, wherein the particle size of said Co-ferrite fine particles is ½ or less of the length in short axis of said acicular iron oxyhydroxide particles.

3. A method for preparing ferromagnetic iron oxide particles as in claim 1, wherein said acicular iron oxyhydroxide particles have a length in short axis of 400 Å or less, and said Co-ferrite fine particles have a particle size of 200 Å or less.

4. A method for preparing ferromagnetic iron oxide particles as in claim 1, wherein at least one of the Co and Fe ions of said Co-ferrite fine particles is partially substituted with one or more ions selected from the group consisting of Zn, Cd, Ba, Si, and Al in an amount of 50% or less.

5. A method for preparing ferromagnetic iron oxide particles as in claim 4, wherein at least one of the Co and Fe ions of said Co-ferrite fine particles is partially substituted with one or more ions selected from the group consisting of Zn, Cd, Ba, Si, and Al in an amount of 10% or less.

* * * * *